No. 869,400. PATENTED OCT. 29, 1907.
M. L. WELDON.
POULTRY FOUNTAIN.
APPLICATION FILED JAN. 28, 1907.

Witnesses:
C. B. Clark
E. Behel.

Inventor:
Mary Lucile Weldon
By A. O. Behel
Attys.

UNITED STATES PATENT OFFICE.

MARY LUCILE WELDON, OF ROCKFORD, ILLINOIS.

POULTRY-FOUNTAIN.

No. 869,400.　　　　Specification of Letters Patent.　　　　Patented Oct. 29, 1907.

Application filed January 28, 1907. Serial No. 354,573.

*To all whom it may concern:*

Be it known that I, MARY LUCILE WELDON, a citizen of the United States, residing at Rockford, in the county of Winnebago and State of Illinois, have invented certain new and useful Improvements in Poultry-Fountains, of which the following is a specification.

The object of this invention is to construct a fountain for poultry use, comprising a vessel having an opening for filling, and provided with a cap for hermetically sealing it, and an open cup having a connection with the vessel.

The further object of this invention is to pack the vessel within a suitable box with some heat non-conducting material for instance, chaff.

Figure 1:
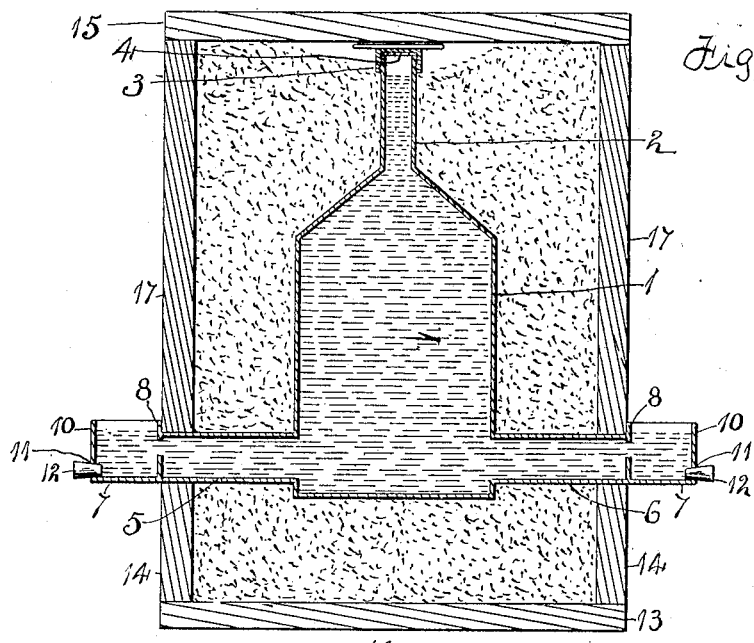
Figure 2:
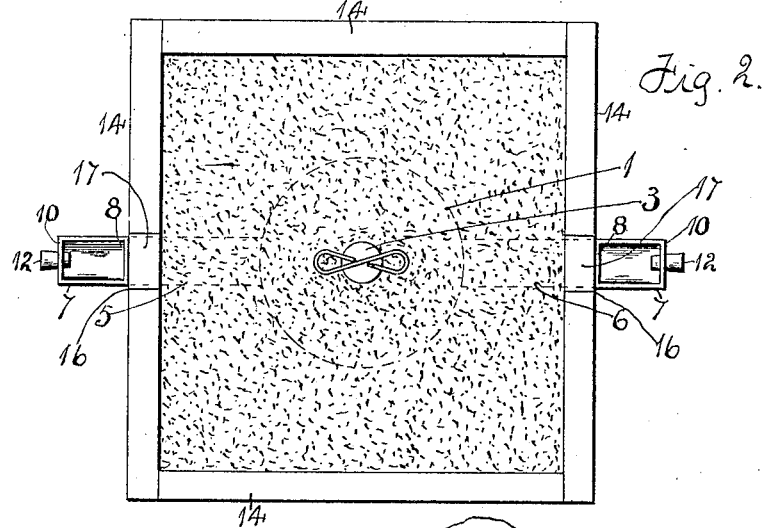
Figure 3:
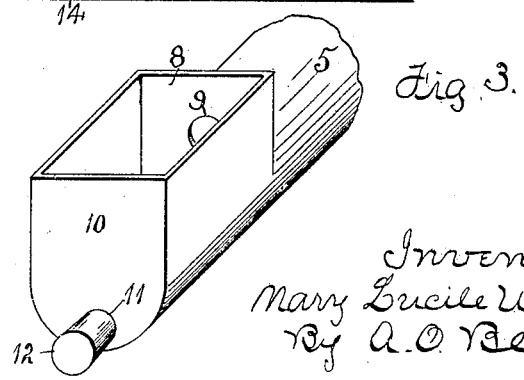

In the accompanying drawings Figure 1 is a vertical section through the box and receptacle. Fig. 2 is a plan view of the box with the cover removed. Fig. 3 is an isometrical representation of the cup and a section of the connecting pipe.

The vessel 1 has a neck 2, its open end provided with a screw-cap 3, and a packing 4 is placed in the cap to form an air tight joint.

From the lower end of the vessel extends two pipe sections 5 and 6. The pipe sections 5 and 6 each have its end formed into a cup 7. The wall 8 separating the cup from the pipe section is provided with an opening 9, and the outer end 10 of the cup has an opening 11 which is closed by a plug 12.

The vessel 1 is placed within a box composed of the bottom 13, sides 14 and removable top 15. Two of the sides 14 are provided with vertical openings 16 to permit the pipe sections 5 and 6 to be placed therein, and the removable sections 17 fill the openings. Around the vessel, its neck and pipe sections, and beneath the same is placed a filling, for instance chaff, and closely packed. The plugs 12 are placed in the openings 9, the vessel is filled with hot water, and the cap 3 turned down tight. The plugs are then removed from the openings 9 and placed in the openings 11 which will allow the water to nearly fill the cups as shown at Fig. 1. The removable top 15 is placed over the opening of the box. The chaff will hold the heat in the water for a considerable time, for instance twelve hours. The water will always remain at the same level in the cups and will be warm.

By closing the opening 9 with a suitable stopper and removing the stopper 12 from the opening 11, the dirty water in the cup is allowed to run out and the cup may be cleaned without the water in the vessel being allowed to run out or the cup being turned upside down.

I claim as my invention—

A poultry fountain comprising a vessel and a cup having a pipe connection with the vessel, an outer casing within which the vessel is placed, heat non conducting material packed around the vessel, the cup provided with a discharge opening also with an opening communicating with the pipe, and a removable stopper adapted to be inserted in either opening.

MARY LUCILE WELDON.

Witnesses:
　A. O. BEHEL,
　E. BEHEL.